Sept. 14, 1965 W. L. STAHL 3,206,724

SEQUENCE INDICATING CIRCUITS

Filed Oct. 22, 1959 4 Sheets-Sheet 1

INVENTOR
WILLIAM L. STAHL

BY

Mitchell & Bechert

ATTORNEYS

Sept. 14, 1965 W. L. STAHL 3,206,724

SEQUENCE INDICATING CIRCUITS

Filed Oct. 22, 1959 4 Sheets-Sheet 2

Sept. 14, 1965 W. L. STAHL 3,206,724

SEQUENCE INDICATING CIRCUITS

Filed Oct. 22, 1959 4 Sheets-Sheet 3

| | COMPARATOR UNIT 85 | | COMPARATOR UNIT 84 | | COMPARATOR UNIT 83 | | REGISTER UNIT 108 |
|---|---|---|---|---|---|---|---|
| | CORE 91 | CORE 98 | CORE 93 | CORE 100 | CORE 96 | CORE 103 | |
| READING | B | A | A | A | A | A | |
| 1ST DRIVING PULSE | B | B | B | B | B | B | AA |
| 1ST SHIFT | B | B | B | A | A | A | |
| 2ND DRIVING PULSE | B | B | B | B | B | B | AA |
| 2ND SHIFT | B | B | B | B | B | A | |
| 3RD DRIVING PULSE | B | B | B | B | B | B | BA |
| 3RD SHIFT | B | B | B | B | B | B | |

Sept. 14, 1965 W. L. STAHL 3,206,724

SEQUENCE INDICATING CIRCUITS

Filed Oct. 22, 1959 4 Sheets-Sheet 4

United States Patent Office 3,206,724
Patented Sept. 14, 1965

3,206,724
SEQUENCE INDICATING CIRCUITS

William L. Stahl, Fishkill, N.Y., assignor to International Business Machines Corporation, New York, N.Y., a corporation of New York Filed Oct. 22, 1959, Ser. No. 848,104
10 Claims. (Cl. 340—146.2)

The present invention relates to apparatus for indicating the time sequence in which preselected indicia are detected, and more particularly to new and improved electrical circuits utilizing solid state devices for effecting such function.

In many computer systems, circuitry is employed which is capable of indicating the time sequence in which related indicia are detected. For example, such circuitry is often utilized to compare separate bits of information derived from a data storage medium, and to provide an output which indicates whether these bits are coincidentally detected or, if not, the order in which they are detected. In computer systems where the time of bit detection is indicative of another parameter (for example, value in punched card systems) such circuitry may be employed to effect a collating or comparison function. In the past, these functions have been accomplished through the use of relatively cumbersome, expensive, and slow-acting circuitry, often utilizing electromagnetic relays or the like.

Accordingly, it is an object of the present invention to provide new and improved sequence indicating circuits wherein solid state devices may be utilized in place of the relatively disadvantageous circuit elements hereinbefore employed.

An apparatus illustrating certain aspects of this invention may comprise first and second storage elements each having first and second stable states, means for initially setting the storage elements in a selected one of these states, and first and second input means for each of the storage elements, the first input means being operable when energized to switch the first storage element to the second state and the second storage element to the first state, the second input means being operable when energized to switch the first storage element to the first state and the second storage element to the second state, and the first and second input means being adapted to exert no switching influence on the storage elements when coincidentally energized.

The apparatus above-described is capable of performing a comparison function whereby the resultant relative states of the first and second storage elements indicate the time sequence in which first and second preselected indicia are detected. The invention also provides circuitry which provides a positive registration of this result. An apparatus illustrating this aspect of the invention may comprise first, second and third storage elements each having first and second stable states, means for initially setting the storage elements in the first state, and first and second input means for each of the storage elements, the first input means being operable when energized to switch the first storage element to the first state and the second storage element to the second state, the second input means being operable when energized to switch the first storage element to the second state and the second storage element to the first state, the first and second input means being adapted to exert no switching influence on the first and second storage elements when coincidentally energized, and being operable only when coincidentally energized to switch the third storage element to the second state, whereby energization of the first input means alone switches the second storage element alone, energization of the second input means alone switches the first storage element alone, and coincidental energization of the first and second storage elements switches the third storage element alone.

The foregoing and other objects, features and advantages of the invention will be apparent from the following more particular description of preferred embodiments of the invention, as illustrated in the accompanying drawings.

Figure 1:
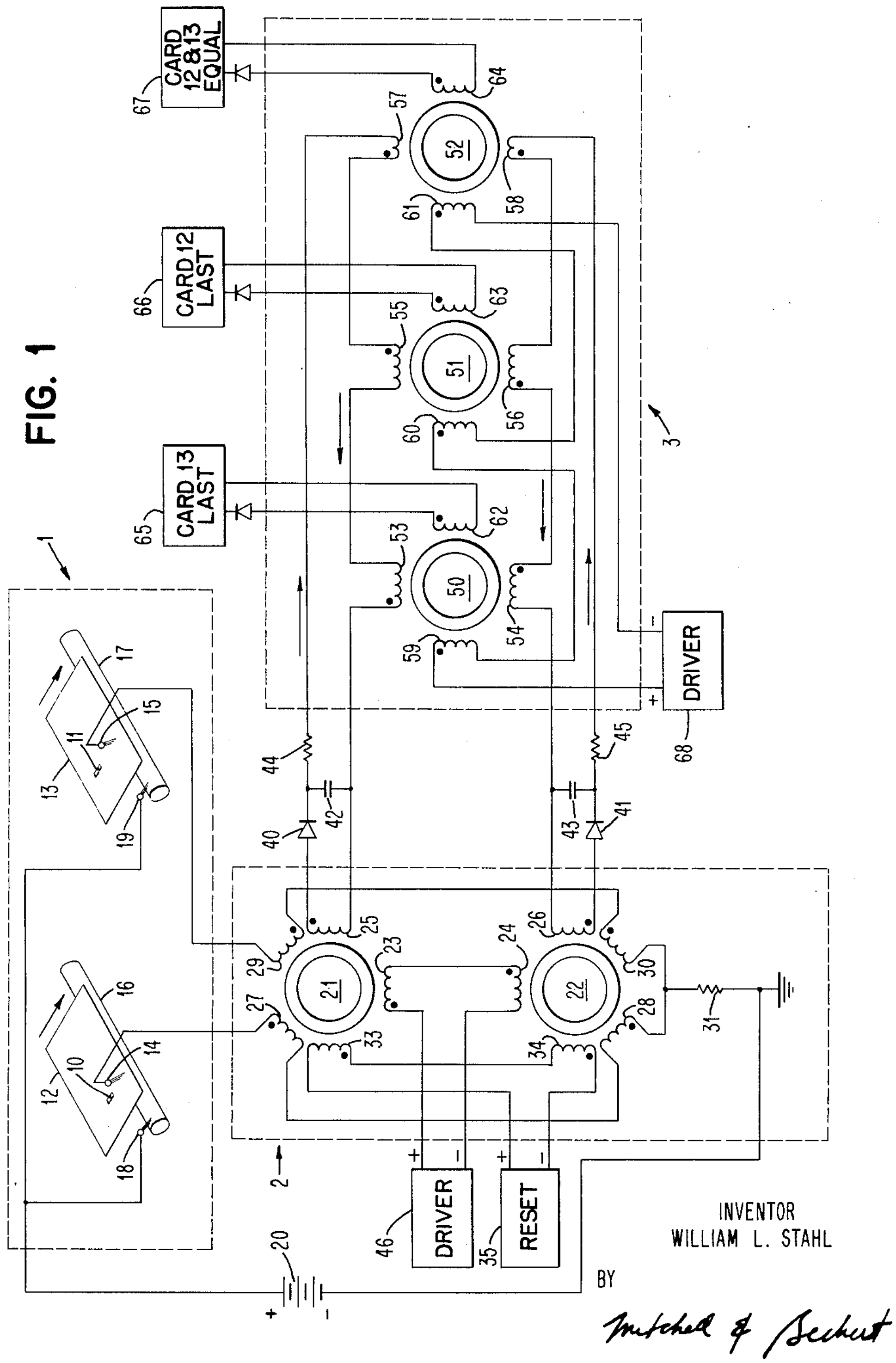
FIG. 1 is a circuit diagram of a single stage sequence indicating means in accordance with the present invention.

The circuitry illustrated in FIG. 1 may be divided into a detector unit 1, a comparator unit 2, and a register unit 3. It is adapted to compare and indicate the relative values of two bits of information in the form of holes 10 and 11 recorded in corresponding vertical columns of different punched cards 12 and 13. In unit 1, the detection of a hole is accomplished in each case by moving the card past an electrically conductive sensing brush element 14 or 15, by means of an electrically conductive roller 16 or 17, connected to a source of D.C. voltage 20, through another brush element 18 or 19. Each sensing element and its associated roller act as a normally-open switch which is permitted to close only upon the passage of a hole beneath the sensing element, thereby to signal the detection of such hole. As is well known in the computer art, the position of a hole in its column is indicative of the value of the bit represented by that hole. Thus, by initially positioning the cards 12 and 13 in corresponding starting positions, and by synchronously moving the cards past the respective sensing elements, the relative values of these bits of information may be read in terms of the sequence in which the holes 10 and 11 are detected.

Comparator unit 2 comprises two storage elements which, in this embodiment, take the form of bistable magnetic cores 21 and 22. Each core is provided with a driver winding 23 and 24, respectively, an output winding 25 and 26, respectively, a reset winding 33 and 34, respectively, and two input windings 27, 29 and 28, 30, respectively. Input windings 27 and 28 are connected in a first series circuit arrangement including brush element 18, roller 16, sensing element 14 and a resistor 31. Input windings 29 and 30 are connected in a second series circuit arrangement including brush element 19, roller 17, sensing element 15 and resistor 31. Both of these circuit arrangements are connected across D.C. voltage source 20.

In this way, the detection of a hole by a sensing element causes a D.C. voltage to be applied across the series circuit arrangement associated with that sensing element. This energizes the two input windings in that series circuit, each of these windings being coupled to a different one of the magnetic cores. Furthermore, these windings are polarized so that when they are energized they drive the two magnetic cores to opposite magnetic states relative to one another. Thus, if one of the magnetic states is denoted A and the other B, the detection of a hole by a sensing element will leave one of the magnetic cores in the magnetic state A and the other magnetic core in the magnetic state B.

An appropriate polarity arrangement of the input windings to effect this end is indicated in FIG. 1 by dot notation. In the notation used, current entering a winding at the dotted end switches the associated core from magnetic state A to magnetic state B. Conversely, current entering the winding at an undotted end switches the associated core from magnetic state B to magnetic state A. Thus, following the convention wherein current flows from plus to minus, the detection of a hole by sensing element 14 switches core 21 to the magnetic state B and core 22 to the magnetic state A, while detection of a hole by sensing element 15 switches core 21 to the magnetic state A and core 22 to the magnetic state B. It will be noted that the input windings associated with the same core are oppositely polarized. In this way, the detection of a hole by sensing element 14 is indicated by the combination of magnetic state B in core 21 and magnetic state A in core 22, while the detection of a hole by sensing element 15 is indicated by the combination of magnetic state A in core 21 and magnetic state B in core 22.

The operation of comparator unit 2 in indicating the relative values of the bits of information represented by the holes 10 and 11 will be described by assuming that the cores 21 and 22 are both initially in the magnetic state A. They may be switched into such initial state by the application of a pulse from reset circuit 35 through reset windings 33 and 34. From the relative positions of the holes 10 and 11 on their respective cards 12 and 13, it will be seen that hole 10 will be detected by sensing element 14 prior to the detection of hole 11 by sensing element 15. This causes current to flow through input windings 27 and 28 first, thereby switching core 21 to the magnetic state B. Core 22 will remain in the magnetic state A since winding 28 is so polarized. Sometime thereafter, sensing element 15 detects hole 11 thereby causing current to flow through windings 29 and 30. The energization of winding 29 will drive core 21 from the magnetic state B to the magnetic state A, while the energization of winding 30 drives core 22 from the magnetic state A to the magnetic state B. Thus, the completion of the sensing operation leaves the cores in magnetic states which represent the detection of a hole by sensing element 15. This indicates the time sequence in which the holes were detected since each of the magnetic cores would have been left in the opposite state if hole 10 had been detected last. Consequently, since the time sequence of detection is related to the relative positions of holes 10 and 11 on their respective cards 12 and 13, the comparator unit has produced an indication of the relative values of the bits of information represented by the holes.

In the event that the bits of information represented by holes 10 and 11 are equal in value, the comparator unit 2 may be adapted to so indicate. As is well known, a certain minimal energy is required to switch a given core from one magnetic state to the other. Thus, the oppositely polarized input windings 27 and 29, for example, associated with the same core 21 may be so designed as to provide sufficient cancellation, if coincidentally energized, such that there will not be enough residual energy to switch core 21. The same is true for input windings 28 and 30. This, of course, is most advantageously effected by making all the input windings identical. In this way, if holes 10 and 11 are coincidentally detected, the magnetic states of cores 21 and 22 will remain unchanged; that is, both will remain in their initial magnetic state A. A resultant combination of identical magnetic states in both cores after the detection operation, therefore, indicates that the detected bits of information are equal in value.

From the foregoing description of the embodiment of FIG. 1, it will be seen that the comparator unit 2 produces a readable indication of the time sequence which two related indicia are detected. The invention further provides a solid state register unit 3 which clearly and distinctly signals the time sequence indicated by the comparator unit 2. Conventional circuitry may be utilized to transfer the information (in terms of magnetic state) from comparator cores 21 and 22 to the register unit 3. In this embodiment, the operation of register unit 3 will be described with reference to a "one core per bit" type of transfer circuit, it being understood that other types of transfer circuits, such as "two core per bit" or "diodeless core logic" might also be employed. A "one core per bit" transfer circuit is particularly advantageous, however, in that it requires only one driver circuit to operate and, in addition, has a speed range which is well suited to the purposes of this invention.

Accordingly, a driver circuit 46 is provided for applying a driving pulse to driver windings 23 and 24, respectively, each time an output from cores 21 and 22 is desired. In this case, the driving pulses are applied after the completion, by sensing elements 14 and 15, of the detecting operation so that the magnetic states of the comparator cores will contain the proper resultant information. As shown in FIG. 1, the driver windings 23 and 24 are both polarized so that their energization by a driving pulse switches their respective cores from magnetic state A to magnetic state B. Thus, if core 21, for example, is in magnetic state A when a driving pulse is applied, it will be switched and an output voltage will be induced across output winding 25. If, on the other hand, core 21 is in magnetic state B when a driving pulse is applied, no switching will occur and, consequently, no output voltage will be induced across the output winding. The same is true of core 22.

The driver circuit 46 may be of conventional design and, therefore, is represented by block diagram in FIG. 1. Driver arrangements will depend, among other things, on the type of transfer circuit chosen and on the speed of operation. The driver unit may be transistorized to conform to the solid state design of the apparatus.

The output voltage pulses induced across output windings 25 and 26 are applied to register unit 3 through the medium of the transfer circuits. Each transfer circuit comprises a diode 40 and 41, respectively, a capacitor 42 and 43, respectively, and a resistor 44 and 45, respectively. The diode and resistor are connected in series, with the diode being connected to one end of the associated output winding. One terminal of the capacitor is connected to a junction point between the diode and resistor and the other terminal is connected to the other end of the associated output winding.

Register unit 3 is adapted to produce a separate registration for each of the possible indications producible by comparator unit 2. To this end, the register unit includes three cores 50, 51 and 52. Core 50 is adapted to produce an output voltage when a hole is detected in card 13 last. Core 51 is adapted to produce an output voltage when a hole is detected in card 12 last. Core 52 is adapted to produce an output voltage when holes are detected in cards 12 and 13 at the same time.

Each of the register cores is provided with a pair of input windings 53, 54; 55, 56 and 57, 58, respectively. In addition, each core is provided with a driver winding 59, 60 and 61, respectively, and an output winding 62, 63 and 64, respectively. The output windings are connected to signal circuits 65, 66 and 67, respectively. The driving pulses for the driver windings are provided by means of a driver circuit 68. The input windings 53, 55 and 57 are connected in a first series circuit arrangement which, in turn, is connected across the transfer circuit associated with output winding 25 of comparator 21. The input windings 54, 56 and 58 are connected in a second series circuit arrangement which, in turn, is connected across the transfer circuit associated with output winding 26 of comparator core 22. Thus, each register core is adapted to receive inputs from both of the comparator cores 21 and 22. Furthermore, the output of each comparator core is applied coincidentally to all three register cores.

The operation of the register unit will be described for the three different indications producible by the comparator unit. The first case described will be that when core 21 is in the magnetic state B and core 22 is in the magnetic state A, whereby the comparator unit indicates that a hole has been detected in card 12 last. The application of a driving pulse from circuit 46, at that time, induces an output voltage at output winding 26 but not at output winding 25. Due to the selected polarization of output winding 26, the output voltage thus induced produces a current which flows out of the dotted end of the output winding. Diode 41 permits current flow in this direction and, therefore, the charging of capacitor 43 in a direction such that the common junction between diode 41, capacitor 43 and resistor 45 becomes positively charged. Capacitor 43 then discharges through resistor 45 and the series circuit arrangement including windings 58, 56 and 54 in the current direction shown and at a rate which is determined by the values of capacitor 43 and resistor 45. Thus, the "one core per bit" type of transfer circuit dynamically stores the output voltage pulse from output winding 26 and then coincidentally applies it to the input windings of the register magnetic cores.

In accordance with the invention, the register cores 50, 51 and 52 are all initially in the same magnetic state, in this case, for example, magnetic state B. The input windings 54, 56 and 58 are thereupon so adapted that only one of the register cores will be switched into magnetic state A by the current flow produced by capacitor 43. Thus, current will flow into the undotted end of input winding 58. This will tend to drive core 52 into magnetic state A. However, input winding 58 is designed so that its energization alone is not sufficient to switch core 52. The current produced will also flow into the undotted end of input windings 56. This winding is designed so that its energization is sufficient to switch core 51, thereby switching that core into the magnetic state A. Finally, the current produced flows into the dotted end of winding 54. Core 50 will, therefore, remain in magnetic state B. In this way, only one of the register cores, core 51, is switched into a different magnetic state when hole 10 in card 12 is detected last.

Assuming now that hole 11 in card 13 is detected last, comparator core 21 will be left in magnetic state A and comparator core 22 will be left in magnetic state B. The application of a driving pulse from circuit 46, at that time, induces an output voltage at output winding 25 but not at output winding 26. Due to the selected polarization of output winding 25, the output voltage thus induced produces a current which flows out of the dotted end of the output winding and through diode 40. A dynamic storage transfer is again effected whereby the common junction between diode 40, capacitor 42 and resistor 44 becomes positively charged, and current flows through input windings 57, 55 and 53 in the direction shown. The input windings are adapted so that only one of the register cores will be switched into magnetic state A by the current flow produced by capacitor 42. Thus, current will flow into the undotted end of input winding 57. This will tend to drive core 52 into magnetic state A. However, input winding 57 is designed so that its energization alone is not sufficient to switch core 52. The current produced will also flow into the dotted end of input windings 55. Core 51 will, therefore, remain in magnetic state B. Finally, the current produced flows into the undotted end of winding 53. This winding is designed so that its energization is sufficient to switch core 50 into the magnetic state A. In this way, only one of the register cores, core 50, is switched into a different magnetic state when hole 11 in card 13 is detected last.

Assuming now that holes 11 and 12 are sensed at the same time, both comparator cores 21 and 22 will be left in magnetic state A. The application of a driving pulse from circuit 46 at that time induces an output voltage at both output windings 25 and 26. These output voltages will operate through their respective transfer circuits to produce current flow in the direction shown through both series input winding arrangements in the register unit. Thus, current will flow coincidentally into the undotted ends of input windings 57 and 58. These windings are designed so that their coincidental energization is sufficient to switch core 52 into the magnetic state A. Current will also flow coincidentally into the dotted end of input winding 55 and the undotted end of input winding 56. The input windings 55 and 56 are designed so that their opposite polarization causes sufficient energy cancellation such that core 51 will remain in the magnetic state B. Current will also flow coincidentally into the undotted end of input winding 53 and the dotted end of input winding 54. These input windings are also designed so that their opposite polarization causes sufficient energy cancellation such that core 50 will remain in the magnetic state B. In this way, only one of the register cores, core 52, is switched into a different magnetic state when holes 10 and 11 are coincidentally detected.

In summary, it has been shown that only one register core will be switched into a different magnetic state when a driving pulse from driver circuit 46 transfers a reading from comparator unit 2 into register unit 3. Furthermore, a different register core will be switched for each of the time sequence conditions which may be indicated by the comparator unit. In this way, a positive indication of the time sequence of detection is produced by register unit 3. This indication may be registered by the coincidental application of a driving pulse from driver circuit 68 to the driver windings 59, 60 and 61. This driving pulse will switch only that core which has been switched into the magnetic state A. It will, therefore, induce an output voltage in only the associated one of the output windings 62, 63 and 64, which, in turn, will operate only the associated one of the signal circuits 65, 66 and 67. It should be noted that the driving pulses also reset the switched register core back to its initial state whereby the register unit 3 is prepared for a succeeding operation.

Figure 2:
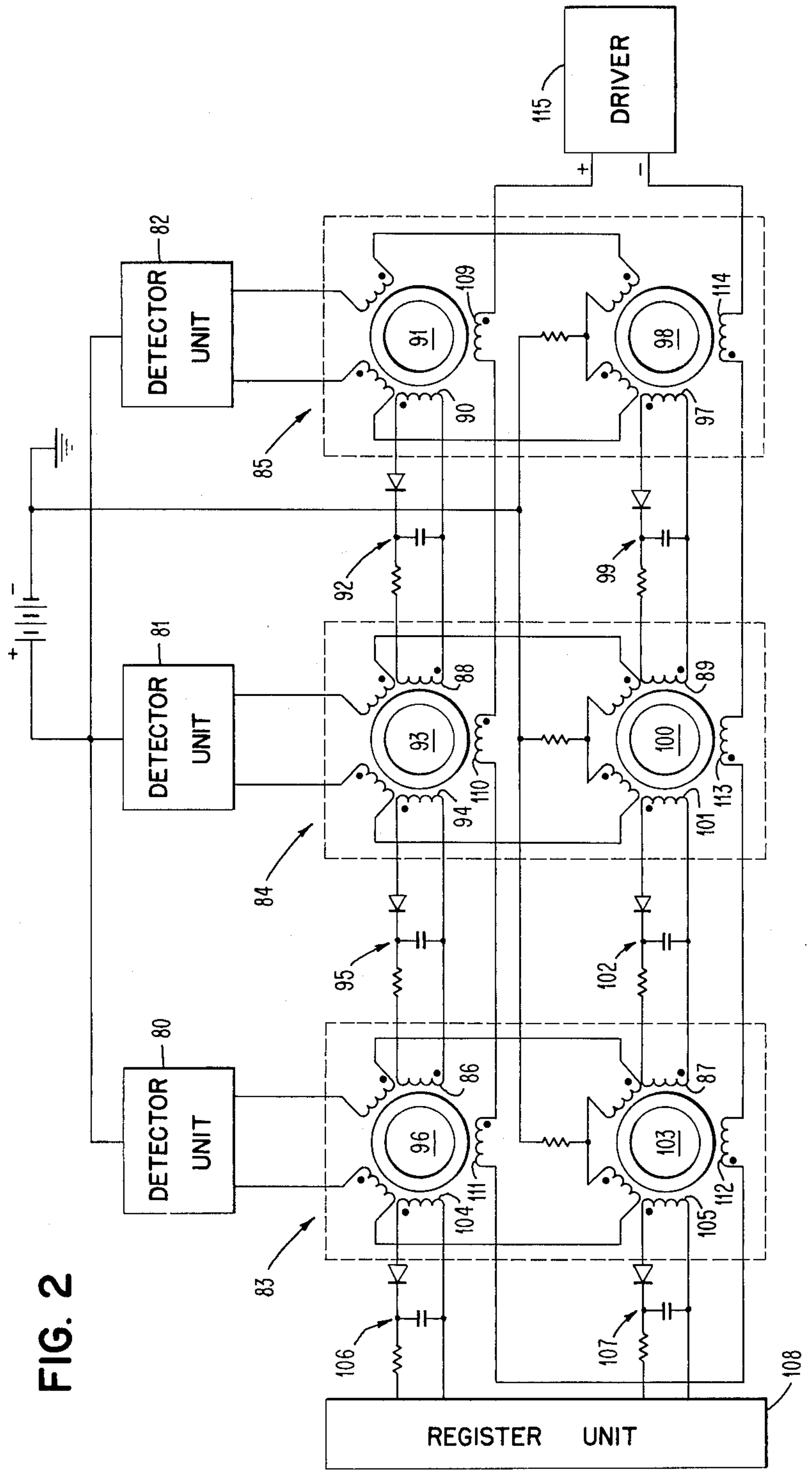
FIG. 2 is a circuit diagram of a serial output, multi-stage sequence indicating means in accordance with the invention.
Figure 4:
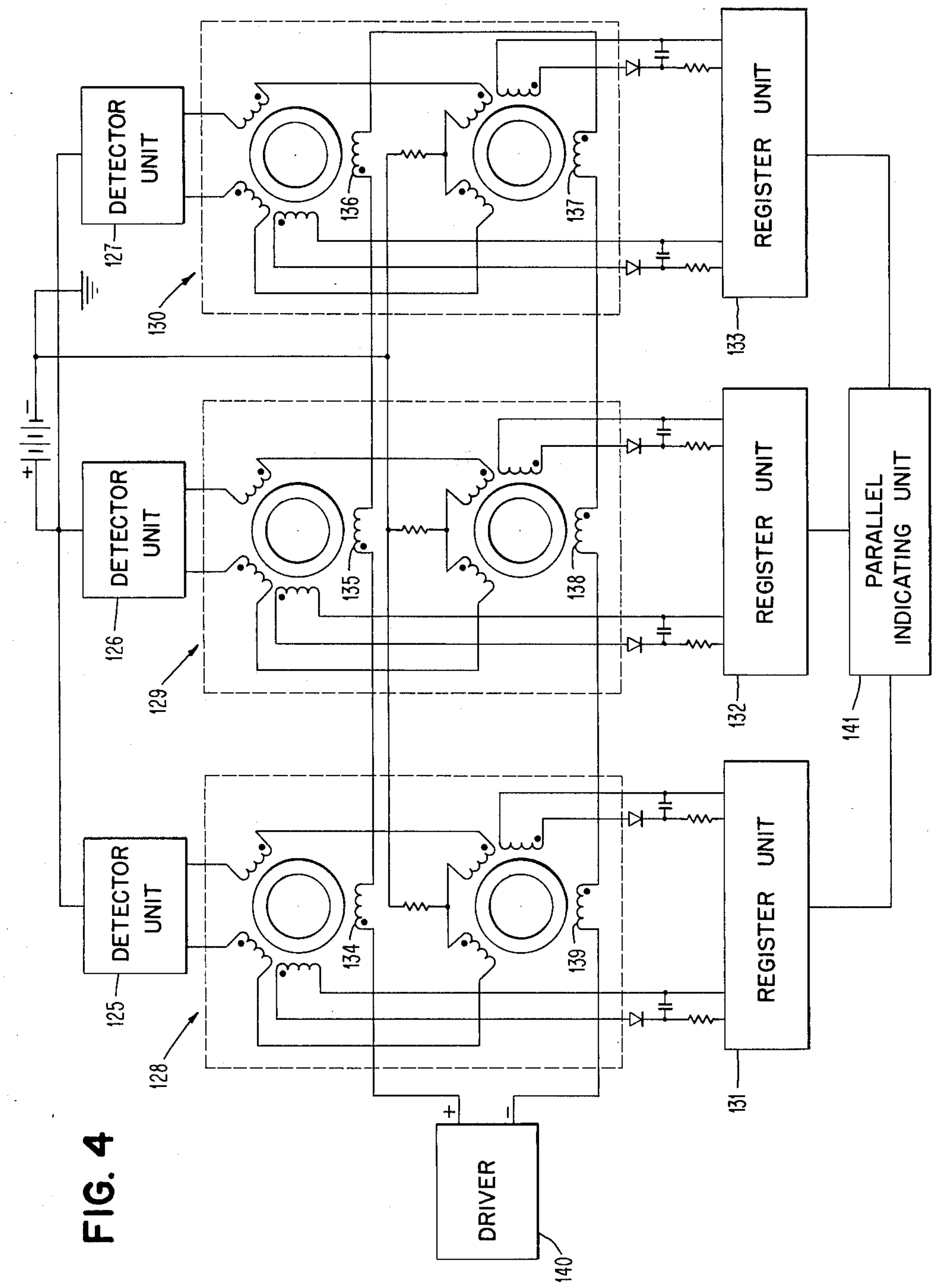
FIG. 4 is a circuit diagram of a parallel output multi-stage sequence indicating means in accordance with the invention.

For simplicity in explanation, the invention has been described with reference to the embodiment of FIG. 1 which is adapted to compare only two related data card columns. The invention however, may readily be adapted for multi-column comparison with either serial or parallel output as indicated in FIGS. 2 and 4, respectively. In the embodiment of FIG. 2, a separate detector unit 80, 81 and 82, respectively, and a separate comparator unit 83, 84 and 85, respectively, are utilized for each pair of columns to be compared. The detector units may be identical to that shown in FIG. 1 and, therefore, are represented in block form. The comparator units may also be identical to that shown in FIG. 1, excepting that an additional input winding 86, 87, 88 and 89, respectively, is added to the magnetic cores of comparator units 83 and 84. The corresponding cores in each comparator unit are then connected together in tandem so as to effectively form a shift register wherein comparator units 85, 84 and 83 are the first, second and last stages, respectively. To this end, the output winding 90 of core 91 is connected through a "one core per bit" type transfer circuit 92 to the input winding 88 of core 93, while the output winding 94 of core 93 is connected through transfer circuit 95 to the input winding 86 of core 96. Also, the output winding 97 of core 98 is connected through transfer circuit 99 to input winding 89 of core 100, while the output winding 101 of core 100 is connected through transfer circuit 102 to the input winding 87 of core 103. Finally, the output windings 104 and 105 of cores 96 and 103, respectively, are connected through transfer circuits 106 and 107, respectively, to register unit 108 which may be similar to the register unit shown in FIG. 1.

Each comparator unit operates independently and as described with reference to FIG. 1 to produce an indication representative of the time sequence in which indicia are detected by the associated detector unit. After the comparison function has been effected in all of the comparator units, driving pulses are coincidentally and periodically applied to all of the magnetic cores therein. This is accomplished by connecting the driver windings 109, 110, 111, 112, 113 and 114 of each of the cores, respectively, in series to a driver circuit 115. Each time a driving pulse is applied, the information in the cores of a preceding stage is transferred into the cores of a succeeding stage, while the information in cores 96 and 103 in the final comparator stage 83 is transferred into register unit 108. Thus, the information in each comparator unit is shifted into output circuit 108 in order by successive driving pulses to provide the desired serial output.

Figures 3, 5:
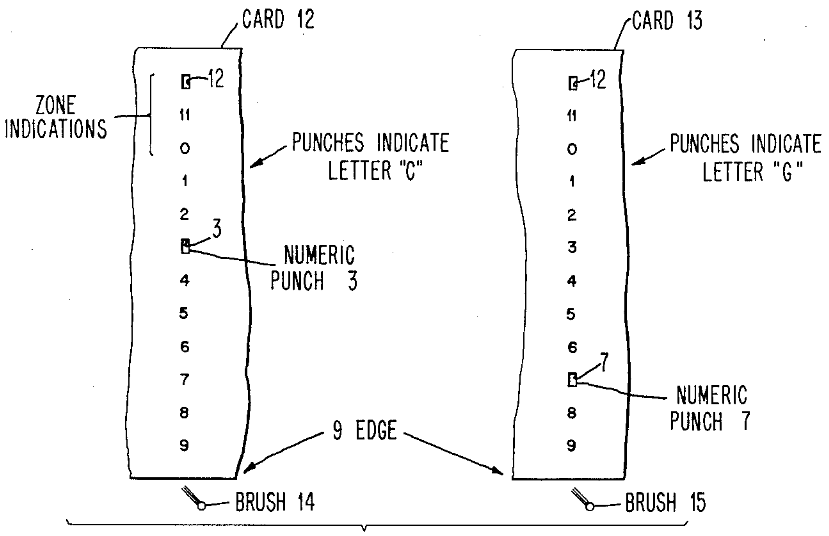
FIG. 3 is a chart of the magnetic states assumed by the storage elements utilized in the sequence indicating means of FIG. 2 during its operation.
FIG. 5 is a fragmentary showing of two cards punched in Hollerith code for alphabetical comparison.

This operation may best be described by the example illustrated in the chart of FIG. 3. In this example, it is assumed that the comparison function has been completed and that the cores are left in the magnetic states indicated in the top line of the chart. The application of a first driving pulse will then switch each of the cores to the magnetic state shown in the second line of the chart. This also shifts the reading in comparator unit 83 into the register unit 108. In addition, a secondary effect occurs caused by those cores, other than cores 96 and 103, which have undergone a change from magnetic state A to magnetic state B. As seen from the chart, cores 98, 93 and 100 are included in this category. This change in magnetic state in core 98, for example, induces a voltage across output winding 97 which is applied through transfer circuit 99 to input winding 89 of core 100. The polarity of input winding 89 is such as to drive core 100 from magnetic state B to magnetic state A. Since core 100 has been switched to magnetic state B by the first driving pulse, such change in magnetic state does occur. A switch in magnetic state from B to A also occurs in cores 96 and 103 due to the shift from magnetic state A to magnetic state B in cores 93 and 100, respectively. The states in which the cores are left as a result of this secondary effect are shown in the third line in the chart. It will be noted that the result of this secondary effect is to shift the reading of a preceding comparator unit into the succeeding comparator unit. It will also be noted that a change from magnetic state B to magnetic state A resulting from this shift does not produce a tertiary effect because of the inclusion of a diode in each of the transfer circuits which is polarized to block current flow induced by a switch in that direction.

The introduction of a second driving pulse then switches each of the cores to the magnetic state shown in the fourth line of the chart. This also shifts the new reading in comparator unit 83 into the register unit 108. Again, a secondary effect takes place which, again, shifts the comparator unit readings ahead, as shown in the fifth line of the chart. The application of a third driving pulse results in the magnetic states shown in the sixth line and the shift of the new reading in comparator unit 83 to register unit 108. Thus, it is seen from the last column in the chart that the contents of each comparator unit are shifted into register unit 108 in order by successive driving pulses to provide the desired serial output.

FIG. 4 illustrates a means whereby a parallel output may be obtained in a multi-column comparison operation in accordance with the invention. Again, a separate detector unit 125, 126 and 127, respectively, and a separate comparator unit 128, 129 and 130, respectively are utilized for each pair of columns to be compared. The sensing and comparator units, in this embodiment, may be identical to those shown in FIG. 1. Furthermore, each comparator unit is connected to a separate register unit 131, 132 and 133, respectively, which may be of the type shown in FIG. 1. Parallel operation is effected by connecting the driver windings 134, 135, 136, 137, 138 and 139, of the magnetic cores in the comparator units in series to a common driver circuit 140. This transfers the readings in the comparator units to their associated register units in coincidence. The register units may then be connected to an indicator 141 adapted to provide the desired parallel display.

The explanation, by way of example, has been directed primarily to comparison of numeric information (one punch per column). Alphabetic information in Hollerith may, however, also be compared with the circuitry disclosed. Alphabetic information is recorded by two punches per column as illustrated in FIG. 5. The first punch is a numeric punch indicating the location of the letter within a zone of the alphabet, and the other is a zone punch indicating which zone is involved. In the conventional form, the letters are divided into three zones, the first being from A to I, the second from J to R and the third from S to Z. When the cards are compared for alphabetic information they are fed past the sensing brush, "9" edge first as in the case of numerically punched cards. The comparator first compares the numbered punches to see which is highest and then compares the zone punches.

For example, in the illustrated embodiment, brush 15 reads first, thereby driving core 21 to state A and core 22 to state B. Brush 14 then reads, driving core 21 to state B and core 22 to state A. Comparison at this time is that card 13 is "high."

Both brushes 14 and 15 then read the zone punches simultaneously; the effect is that the pulses cancel.

The final state of the cores is: core 21 at B and core 22 at A. The indication is that card 13 is higher and, therefore, G is greater than C.

If the zone punches are not identical, a new comparison is produced in the comparator which overrides the preceding one.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Apparatus for producing a registration of the sequence in which first and second preselected indicia are detected, comprising first and second comparator storage elements each having first and second stable states, means for initially setting said comparator storage elements in a selected one of said states, first and second input means for each of said comparator storage elements, first sensing means responsive to said first indicia and operable to energize said first comparator input means, second sensing means responsive to said second indicia and operable to energize said second comparator input means, said first comparator input means being operable when energized to switch said first comparator storage element to said second state and said second comparator storage element to said first state, said second comparator input means being operable when energized to switch said first comparator storage element to said first state and said second comparator storage element to said second state, said first and second comparator input means being adapted to exert no switching influence on said comparator storage elements when coincidentally energized, whereby the resultant relative states of said first and second comparator storage elements indicate the time sequence in which said first and second indicia are detected by said first and second sensing means, first, second and third register storage elements each having first and second stable states, means for initially setting said register storage elements in said first state, and first and second input means for each of said register storage elements, said first comparator storage element being operable when resultantly in said selected one of said first and second stable states to energize said first register input means, said second comparator storage element being operable when resultantly in said selected one of said first and second stable states to energize said second register input means, said first register input means being operable when energized to switch said first register storage element to said first state and said second register storage element to said second state, said second register input means being operable when energized to switch said first register storage element to said second state and said second register storage element to said first state, said first and second register input means being adapted to exert no switching influence on said first and second register storage elements when coincidentally energized, and being operable only when coincidentally energized to switch said third register storage element to said second state, whereby energization of said first register input means alone switches said second register storage element alone, energization of said second register input means alone switches said first register storage element alone, and coincidental energization of said first and second register input means switches said third storage element alone.

2. A comparator circuit for producing an indication of the time sequence in which first and second indicia are detected, comprising first and second storage elements each having first and second stable states, means for initially setting said storage elements in a selected one of said states, and first and second input means for each of said storage elements, said first input means being operable when energized to switch said first storage element to said second state and said second storage element to said first state, said second input means being operable when energized to switch said first storage element to said first state and said second storage element to said second state, substantially equal means for driving each of said first and second input means, said first and second input means being poled with respect to one another to always cancel in net effect whenever coincidentally energized, thereby exerting no switching influence on said storage elements, and means responsive to the state of said first and second storage elements for indicating the time sequence in which the first and second indicia are applied to the first and second input means.

3. A comparator circuit for producing an indication of the time sequence in which first and second indicia are detected, comprising first and second magnetic storage elements each having first and second states of magnetic stability, means for initially setting said storage elements in a selected one of said states, and first and second input circuit means each including first and second windings magnetically coupled, respectively, to said first and second storage elements, said first input circuit means being operable when energized to switch said first storage element to said second magnetic state and said second storage element to said first magnetic state, said second input circuit means being operable when energized to switch said first storage element to said first magnetic state and said second storage element to said second magnetic state, substantially equal means for driving each of said first and second input means, said first and second input circuit means being poled with respect to one another to always cancel in net effect whenever coincidentally energized, thereby exerting no switching influence on said storage elements, and means responsive to the state of said first and second storage elements for indicating the time sequence in which the first and second indicia are applied to the first and second input means.

4. A comparator circuit in accordance with claim 3, in which said first and second windings in said first input circuit means are connected in one series circuit arrangement, said first and second windings in said second input circuit means are connected in another series circuit arrangement, the windings in the same series circuit arrangement being oppositely polarized, and the windings coupled to the same storage element being oppositely polarized, whereby the application of an energizing voltage of the same polarity to said input circuit means effects the specified switching of said storage elements.

5. A registration circuit, comprising first, second and third storage elements each having first and second stable states, means for initially setting said storage elements in said first state, and first and second input means for each of said storage elements, said first input means being operable when energized to switch said first storage element to said first state and said second storage element to said second state, said second input means being operable when energized to switch said first storage element to said second state and said second storage element to said first state, said first and second input means being adapted to exert no switching influence on said first and second storage elements when coincidentally energized, and being operable only when coincidentally energized to switch said third storage element to said second state, whereby energization of said first input means alone switches said second storage element alone, energization of said second input means alone switches said first storage element alone, and coincidental energization of said first and second input means switches said third storage element alone.

6. A registration circuit, comprising first, second and third magentic storage elements each having first and second states of magnetic stability, means for initially setting said storage elements in said first state, and first and second input circuit means each including first, second and third windings magnetically coupled, respectively, to said first, second and third storage elements, said first input circuit means being operable when energized to switch said first storage element to said first magnetic state and said second storage element to said second magnetic state, said second input circuit means being operable when energized to switch said first storage element to said second magnetic state and said second storage element to said first magnetic state, said first and second input circuit means being adapted to exert no switching influence on said first and second storage elements when coincidentally energized, and being operable only when coincidentally energized to switch said third storage element to said second magnetic state, whereby energization of said first input circuit means alone switches said second storage element alone, energization of said second input circuit means alone switches said first storage element alone, and coincidental energization of said first and second input circuit means switches said third storage element alone.

7. A registration circuit in accordance with claim 6, in which said first, second and third windings in said first input circuit means are connected in one series circuit arrangement, said first, second and third windings in said second input circuit means are connected in another series circuit arrangement, said first windings being oppositely polarized, said second windings being oppositely polarized, the first and second windings in the same series circuit arrangement being oppositely polarized, and said third windings being similarly polarized with their polarization being the same as the polarization of the first winding in said second input circuit and the second winding in said first input circuit, whereby the application of an energizing voltage of the same polarity to said input circuit means effects the specified switching of said storage elements.

8. Apparatus for producing an indication of the time sequence in which first and second preselected indicia are detected, comprising first and second storage elements each having first and second stable states, means for initially setting said storage elements in a selected one of said states, first and second input means for each of said storage elements, first sensing means responsive to said first indicia and operable to energize said first input means, second sensing means responsive to said second indicia and operable to energize said second input means, said first input means being operable when energized to switch said first storage element to said second state and said second storage element to said first state, said second input means being operable when energized to switch said first storage element to said first state and said second storage elements to said second state, and said first and second input means being poled with respect to one another to always cancel in net effect whenever coincidentally energized, thereby exerting no switching influence on said storage elements, and means responsive to the state of said first and second storage elements for indicating the time sequence in which the first and second indicia are applied to the first and second input means.

9. Apparatus in accordance with claim 8, in which said first and second sensing means are each adapted to scan a data card and to be responsive to the encountering of indicia recorded on said card.

10. A multi-stage device each stage of which comprises apparatus in accordance with claim 8, said device further comprising means for coupling said first storage elements in said stages together in a first tandem circuit arrangement, means for coupling said second storage elements in said stages together in a second tandem circuit arrangement, said indicating means coupled to the last stage of said device, and said coupling means being operable to periodically shift the states of said storage elements ahead into succeeding storage elements, whereby a serial indication is provided in said indicating means of the said resultant relative states of the storage elements in each said stage.

References Cited by the Examiner

UNITED STATES PATENTS

| | | | |
|---|---|---|---|
| 2,719,773 | 10/55 | Karnaugh | 340—166 X |
| 2,719,962 | 10/55 | Karnaugh | 340—166 |
| 2,725,549 | 11/55 | Dunnet | 340—149 X |
| 2,884,616 | 4/59 | Fillebrown et al. | 340—146.2 |
| 2,905,931 | 9/59 | Lubkin | 340—149 X |
| 2,915,740 | 12/59 | Ricketts et al. | 340—166 X |
| 2,920,310 | 1/60 | Sallach | 340—174 X |
| 2,920,825 | 1/60 | Lanning | 340—174 X |
| 2,975,298 | 3/61 | Fawcett et al. | 307—88 |
| 2,979,702 | 4/61 | Zarcone et al. | 307—88 X |
| 2,980,803 | 4/61 | Guterman | 340—174 X |
| 2,981,847 | 4/61 | Ruhman | 307—88 |
| 2,989,734 | 6/61 | Miehle | 340—146.2 X |
| 2,994,070 | 7/61 | Goatcher | 307—88 X |
| 3,018,961 | 1/62 | Ward | 307—88 X |
| 3,104,380 | 9/63 | Haibt | 340—146.2 X |

MALCOLM A. MORRISON, *Primary Examiner.*

EVERETT R. REYNOLDS, STEPHEN W, CAPELLI, *Examiners.*